Patented Oct. 3, 1922.

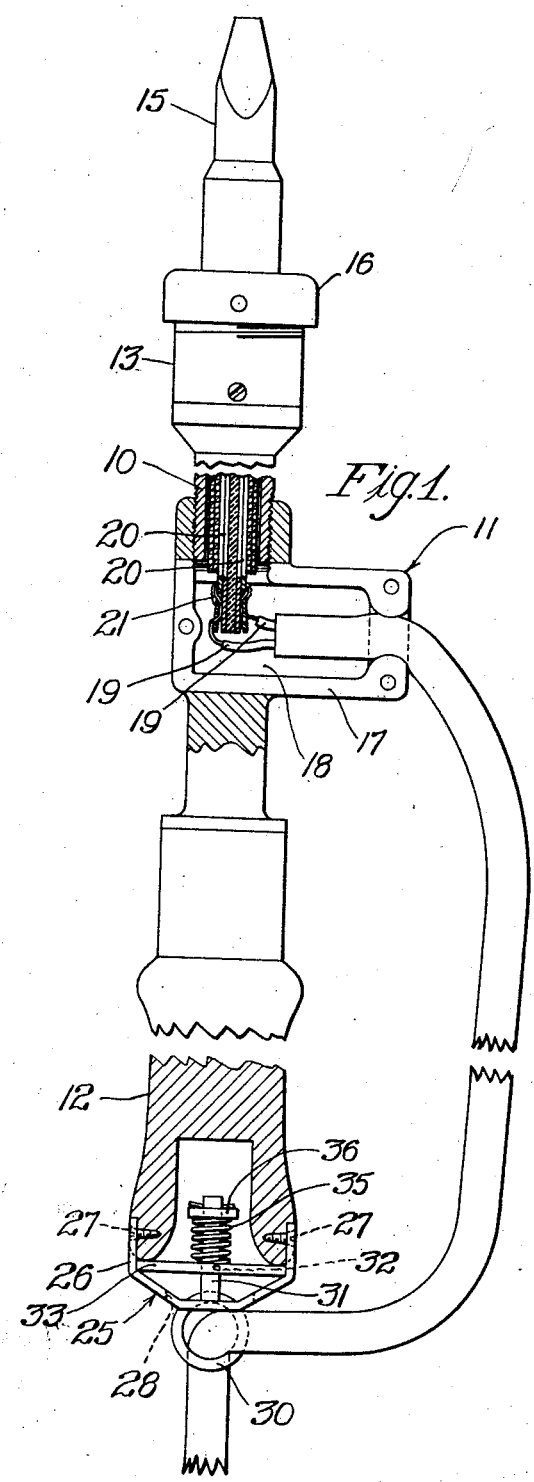
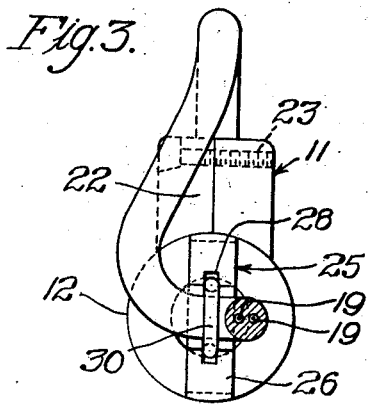
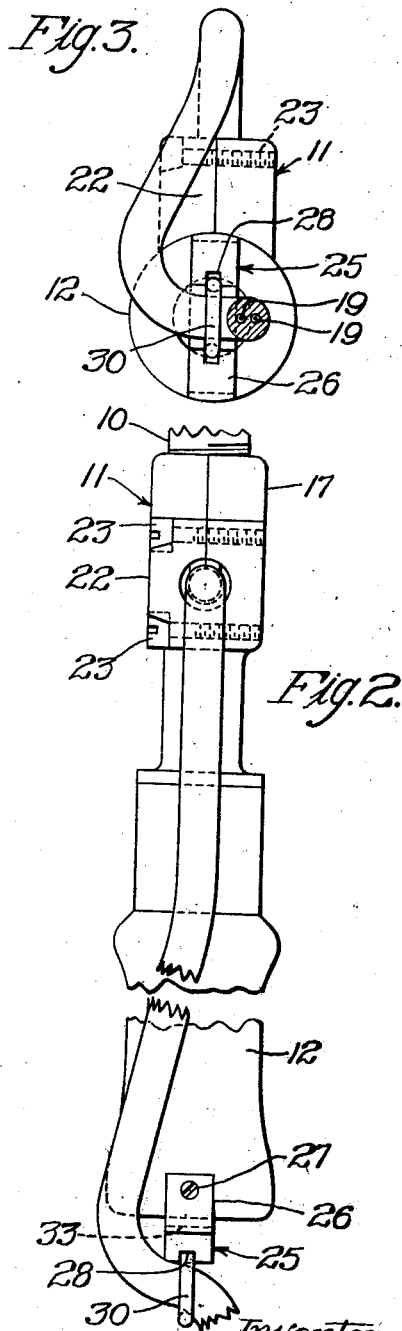

1,430,603

UNITED STATES PATENT OFFICE.

WILLIAM AUGUST TIMM, OF BERWYN, ILLINOIS, ASSIGNOR TO WESTERN ELECTRIC COMPANY, INCORPORATED, OF NEW YORK, N. Y., A CORPORATION OF NEW YORK.

SOLDERING IRON.

Application filed November 20, 1920. Serial No. 425,337.

*To all whom it may concern:*

Be it known that I, WILLIAM AUGUST TIMM, a citizen of the United States, residing at Berwyn, in the county of Cook and State of Illinois, have invented certain new and useful Improvements in Soldering Irons, of which the following is a full, clear, concise, and exact description.

This invention relates to soldering irons and more particularly to a low voltage electrically heated soldering iron.

In the operation of soldering irons of this type where large currents are necessary it is desirable for the best operation of the iron that the conductors from the outside source be of such size that they will not conduct the heat away from the heating element in sufficient amounts to impair its operation in that respect and still be of sufficient size to safely handle the current requirements. Due to the size of the conductors necessary, however, sufficient heat is conducted through them to seriously overheat the handle of the soldering iron if the conductors are carried through it in the manner usual in these tools.

It is the object of this invention to produce a simple and convenient form of iron which will eliminate this heating of the handle. The features of the invention relate to the means provided for eliminating this overheating of the handle.

In its preferred form the invention consists of a soldering iron equipped with a conductor inlet box which also forms a part of the body of the iron positioned between the handle and the soldering head for the entrance of the external current carrying conductors which are secured therein to internal current carrying conductors which connect with a heating element. In conjunction with the inlet box is a conductor holding device which is preferably attached to the bottom end of the handle and serves to hold and form a loop in the conductor between it and the conductor inlet box to one side of the handle to help balance the iron while in use and also to take the weight of the conductors off their point of support on the iron.

In the drawings:

Fig. 1 is a partial elevation of a soldering iron partly in section, embodying the features of this invention;

Fig. 2 is a partial view from the right-hand side thereof, and

Fig. 3 is a bottom plan view of Fig. 2.

As shown in the drawings, 10 is a supporting metal stem which is screw threaded into one arm of a T-shaped conductor inlet box 11 which supports on its opposite arm a handle 12. Upon the opposite end of the stem 10 is secured a sleeve 13 which supports a soldering tip 15 which is secured thereto by a lock nut 16 screw threaded onto the upper end of the sleeve 13.

The inlet box 11 is provided with a portion 17 which projects outwardly from the center of the iron and within which is formed a chamber 18 within which chamber external current carrying conductors 19—19 enter to be connected to internal current carrying conductors 20—20, as indicated at 21, which are connected to a suitable heating element positioned in the upper end of the iron. A cover 22 is provided for the chamber 18 and is secured to the box 11 by screws 23. The cover 22 also serves to clamp the conductors to the box, thereby preventing undue strain at the point of connection between the external and internal conductors.

Upon the lower end of the handle 12 is secured a conductor holding device 25 which consists of a U-shaped strap 26 secured to the handle 12 by screws 27 and which is provided with a rectangular shaped slot 28 in its lower surface and in line with the center of the handle. A spring operated eye 30 through which the conductors 19—19 are threaded projects out of the slot 28 and clamps the conductors between the eye 30 and the strap 26. The eye 30 is secured to a pin 31 which rides in an opening 32 in a cross bar 33 suitably held in position between the strap and the bottom of the handle 12.

A compression spring 35 positioned around the pin 31 and between the cross bar 33 and a retaining disk 36 on the pin 31 functions to draw the eye 30 into the slot 28, thereby clamping the conductors in position. To release the conductors to change the loop formed therein between the box 11 and the eye 30, the eye is pulled out of the slot against the action of the spring 35 and turned 90° to bring it at right angles to the length of the slot. The conductors may now be easily moved in the eye to change the conductors or to enlarge or reduce the loop therein between the inlet box 11 and the eye 30, after which by turning the eye back 90° it will ride into the slot 28 and clamp the conductors in place.

What is claimed is:

1. In an electric soldering iron structure, a tip including a heating element, a handle, and current carrying conductors for connecting the heating element with a source of current, a supporting structure connecting said tip and said handle provided with a chambered portion extending away from the iron, said conductors entering an opening provided in the end of the chambered portion at a point intermediate said tip and said handle thereby being supported by said structure outside the handle portion whereby the handle will be protected from overheating.

2. In an electric soldering iron, a tip including a heating element, a handle, current carrying conductors for connecting the heating element with a source of current, a supporting structure connecting said tip and said handle provided with a chambered portion extending radially from the center of the iron and provided with an opening for the entrance of said conductors thereby supporting the conductors outside the handle portion whereby the handle will be protected from overheating.

3. In an electric soldering iron structure, a tip including a heating element, a handle, current carrying conductors for connecting the heating element with a source of current, said conductors being supported by said structure outside and above the handle portion, and conductor holding means secured to the lower end of said handle for holding the conductors intermediate their connection with the source of current and their point of support on said structure, whereby a loop is formed in said conductors to one side of the handle thereby protecting said handle from overheating.

4. In an electric soldering iron structure, a tip including a heating element, a handle, current carrying conductors for connecting the heating element with a source of current, said conductors being supported by said structure outside and above the handle portion, and spring operated means secured to the lower end of said handle for clamping the conductors intermediate their connection with the source of current and their point of support on said structure whereby a loop is formed in said conductors to one side of the handle thereby protecting said handle from overheating.

5. In an electric soldering iron structure, a tip including a heating element, a handle, current carrying conductors for connecting the heating element with a source of current, said conductors being supported by said structure outside the handle portion whereby the handle will be protected from overheating, and means secured to the lower end of said handle for holding the conductors intermediate their connection with the source of current and their point of support on said structure whereby the iron while being used will be balanced.

6. In a soldering iron structure, a tip including a heating element, a handle, current carrying conductors for connecting the heating element with a source of current, said conductors being supported by said structure outside the handle portion whereby the handle will be protected from overheating, and means secured to the lower end of said handle for holding the conductors intermediate their connection with the source of current and their point of support on said structure whereby the weight of the conductors will be taken off the point of support on said structure.

In witness whereof, I hereunto subscribe my name this 27th day of October, A. D. 1920.

WILLIAM AUGUST TIMM.